United States Patent [19]

Laug et al.

[11] Patent Number: 5,463,797
[45] Date of Patent: Nov. 7, 1995

[54] LINE HOLDING STORAGE DEVICE AND PROCESS OF USING THE SAME

[75] Inventors: Tamara Laug, 4606 Greenbriar Ct., Boulder, Colo. 80303; Robert Bromley, Louisville, Colo.

[73] Assignee: Tamara Laug, Boulder, Colo.

[21] Appl. No.: 217,273

[22] Filed: Mar. 24, 1994

[51] Int. Cl.$^6$ .............................. B65D 77/00; F16G 11/00
[52] U.S. Cl. .................. 24/115 G; 24/30.5 S; 24/71.1; 24/570; 242/388.2
[58] Field of Search ................ 24/115 G, 30.5 S, 24/455, 570, 543; 242/388, 395, 388.2

[56] References Cited

U.S. PATENT DOCUMENTS

| | | | |
|---|---|---|---|
| Re. 27,986 | 4/1974 | Jensen | 24/115 G |
| 101,601 | 4/1870 | Fanning . | |
| 541,925 | 7/1895 | Emery, Jr. | 24/71.1 |
| 588,213 | 8/1897 | Beekly | 242/395 |
| 762,160 | 6/1904 | Finch | 24/570 |
| 930,533 | 8/1909 | Cokely . | |
| 2,220,366 | 11/1940 | Fly . | |
| 2,304,139 | 12/1942 | Benbow . | |
| 2,825,952 | 3/1958 | Van Driel | 24/570 |
| 3,874,638 | 4/1975 | Langlie et al. . | |
| 5,193,252 | 3/1993 | Svehaug | 24/115 G |

FOREIGN PATENT DOCUMENTS

| | | |
|---|---|---|
| 368760 | 8/1906 | France . |
| 374377 | 2/1907 | France . |
| 450347 | 11/1948 | Italy . |

Primary Examiner—Victor N. Sakran
Attorney, Agent, or Firm—Rick Martin; Mary K. Gray

[57] ABSTRACT

A line holding storage device is provided for storing or displaying articles on a line in random locations along the line. The line holding storage device comprises a support housing having a first side and a second side. A channel is formed in the first side of the support housing and receives the line. A securing mechanism is positioned on the first side of the support housing and cooperates with the channel for releasably securing the line holding storage device to the line. A catch mechanism is mounted on the support housing to receive and hold articles which are to be stored or displayed with the catch mechanism being positioned such that the mass of the held article cooperates with the securing mechanism to augment the securement of the line holding storage device to the line.

17 Claims, 2 Drawing Sheets

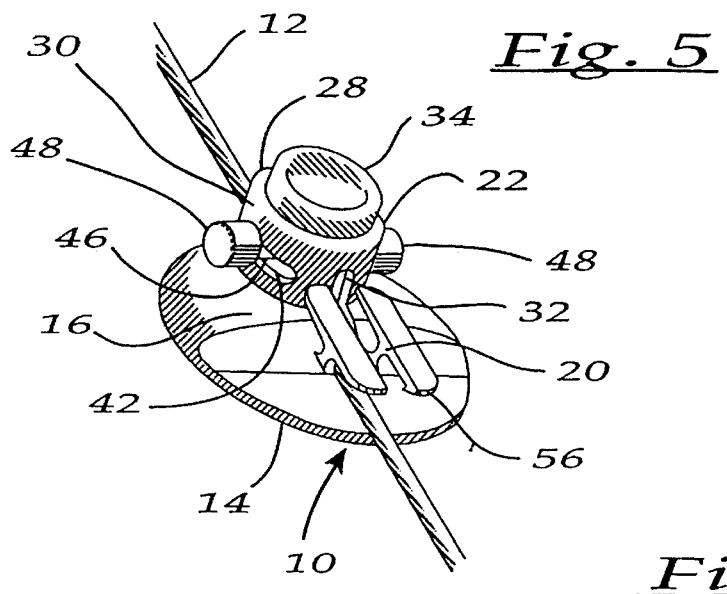
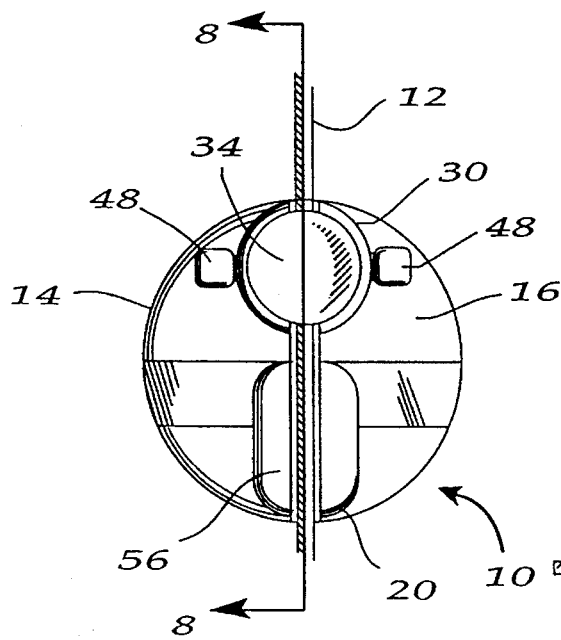
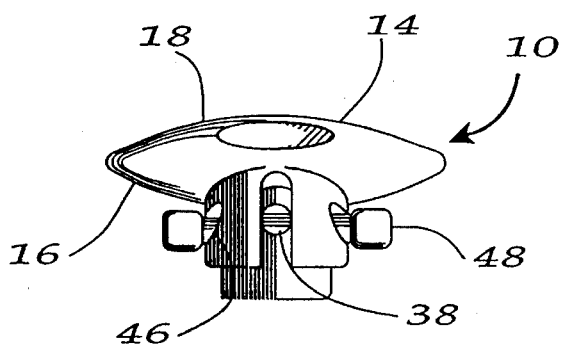
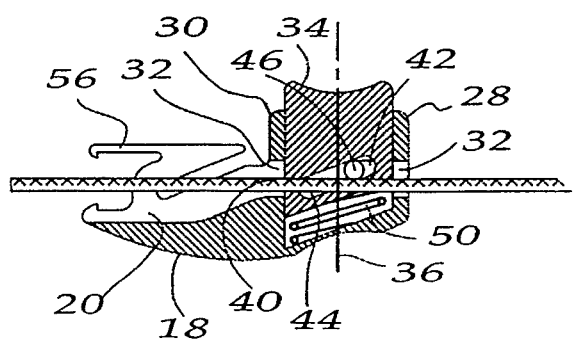

LINE HOLDING STORAGE DEVICE AND PROCESS OF USING THE SAME

BACKGROUND OF THE INVENTION (a) Field of the Invention

The present invention relates to line holding storage devices and, in particular, it relates to line holding storage devices which are capable of being secured at any random portion of a line, and which, when so secured, are designed to hold items thereon for storage and/or display.

(b) Description of the Prior Art

In the prior art, devices for securing or storing an item on a line, such as clothes pins, are only loosely attached, to the line, and tend to be pulled from the line when the load is increased on the holding device. Other devices for securing or storing an item on a line are permanently secured to the line, and/or cannot be randomly positioned on a line to store or display items. There are also mechanisms which are used in mountain climbing and window washing activities which can be randomly secured to a line, but, which generally require release of line tension and/or the movement of the mechanism relative to the line in order to release it from the line.

Devices are known in the prior art which are used to tighten a line by first securing them to a line and then twisting them to tighten the line. For example, Fly, U.S. Pat. No. 2,220,366, describes a line tautness adjuster designed to be placed directly upon a clothes line, or upon any other slightly loose line, and then rotated to tighten the line. A plurality of teeth along the circumference of the adjuster secures the adjuster to the line and maintains the line in taut after it has been tightened. It should be noted that if the line is already taut, the adjuster which is disclosed by the Fly patent can not be utilized since rotation of the adjuster requires that the line initially be loose. Likewise, if the line to which the Fly patent adjuster is to be secured is rigid or semi-rigid, such as a metal or fiberglass rod, the Fly patent adjuster would not be useable due to the rigidity of the rod.

Fanning U.S. Pat. Nos. 101,601; Cokely 930,533; Benbow 2,304,139; French Patent 368,760; French Patent 374,377; and Italian Patent 450,347 describe other tightening devices for stretching or tightening wires, cords, or lines.

These prior art devices would be practically impossible to use as a randomly located storage or display device, since as each such adjuster would further tighten the line, and therefore could not be added or subtracted to a line without changing the tautness of the line.

It is therefore seen that no prior art device is known to exist which provides a line holding storage device for attachment to a line for securing or storing an item on a line having a vertical, horizontal or angled orientation, which does not tend to be pulled from the line when the load is increased on the holding device. Furthermore, no prior art device is known to exist which provides a line holding storage device for attachment to a line which does not require that the line be slack prior to attachment of the device. Additionally, no prior art device is known which provides a line holding storage device which is capable of being secured to a deformable, semi-rigid, rigid, or taut vertical, horizontal or angled line. Furthermore, no prior art device is known which provides a system of line holding storage devices which can be randomly located on a line to allow a variety of goods to be stored or displayed, nor is any prior art device known which provides such a line holding storage device which is provided with a mechanism such that articles can be stored or displayed on the device. Finally, no prior art device is known which can be randomly secured to a line, but, which does not require release of line tension and/or the movement of the mechanism relative to the line in order to remove it from the line.

SUMMARY OF THE INVENTION

It is therefore an object of the present invention to provide a line holding storage device for attachment to a vertical, horizontal or angled orientation line for securing or storing an item thereon, which line holding storage device tend to hold more securely to the line when the load is increased on the line holding storage device.

It is a further object of the present invention to provide a line holding storage device for attachment to a line which does not require that the line be slack prior to attachment of the device.

Additionally, it is an object of the present invention to provide a line holding storage device which can be secured to a deformable, semi-rigid, or rigid line, which line may have a vertical, horizontal or angled orientation.

Furthermore, it is an object of the present invention to provide a system of line holding storage devices such that a variety of goods can be stored or displayed on a line having a vertical, horizontal or angled orientation.

It is a further object of the present invention to provide a line holding storage device for attachment to a line with the line holding storage device being provided with an attachment mechanism which allows articles to be stored or displayed on the device.

As used herein, the term "line" is intended to include cord, rod, rope, string, twine, wire, and equivalent materials which can be provided in various continuous lengths, and which may be subject to deformation, or be semi-rigid or rigid.

In furtherance of the foregoing objects, the present invention provides a line holding storage device for storing articles on a line in various random locations along the line. The line holding storage device comprises a support housing having a first side and a second side. A channel is formed in the first side of the support housing, which channel is shaped and sized to receive a line. A securing mechanism is positioned on the first side of the support housing, which securing mechanism cooperates with the channel for releasably securing the line holding storage device to a line. A catch mechanism is mounted on the support housing for hanging items which are to be stored or displayed, with the catch mechanism being positioned such that the weight of the stored or displayed articles cooperates with the securing mechanism to further augment the securement of the line holding storage device to the line.

In a first embodiment of the present invention, the securing mechanism of the line holding storage device comprises a "S"-shaped channel on the first side of the support housing. At least a portion of the channel has a width less than the diameter of the line to which it is to be attached. The line holding storage device is secured to the line by rotating the support housing about the line so that the line enters the channel thereby press-fitting the line into the channel and securing the line holding storage device to the line. This embodiment of the present invention may be used with vertical, horizontal or angled lines.

In a second embodiment of the present invention, the securing mechanism of the line holding storage device comprises a telescoping sleeve mounted on the first side of the support housing. The sleeve includes a pair of line receiving slots and a pair of guide slots. A clasping button is movably positioned within the sleeve. The clasping button includes an upper line receiving aperture, a lower line receiving aperture and a pair of angled slots. The slots are positioned perpendicularly such that at least a portion of the slots overlay the guide slots of the sleeve. The line extends through the line receiving slots of the sleeve and the line receiving apertures of the clasping button. A roller extends through the guide slots and through the angled slots for camming the roller to a position in which the line is clasped between the clasping button and the roller. A biasing mechanism is positioned within the sleeve for biasing the clasping button away from the sleeve and maintaining the clasping position thereby releasably securing the line holding storage device to the line. This second embodiment of the present invention is best used with vertical or angled lines, but is not easily used with horizontal lines.

While supports for the lines have not been shown, any support may be use, such as a frame to which one or both ends of the line may be attached, one or more post, ceilings, walls, floors, and other art known equivalent structures.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 5 is a perspective view showing a front side view of a line holding storage device according to a second embodiment of the present invention;

FIG. 6 is a top plan view showing the line holding storage device of FIG. 5;

FIG. 7 shows a front side elevational view of the line holding storage device of FIG. 5; and FIG. 8 is a cross sectional view of the line holding storage device FIG. 5 taken along line 8—8 of FIG. 7.

DESCRIPTION OF THE PREFERRED EMBODIMENTS

Figure 1:
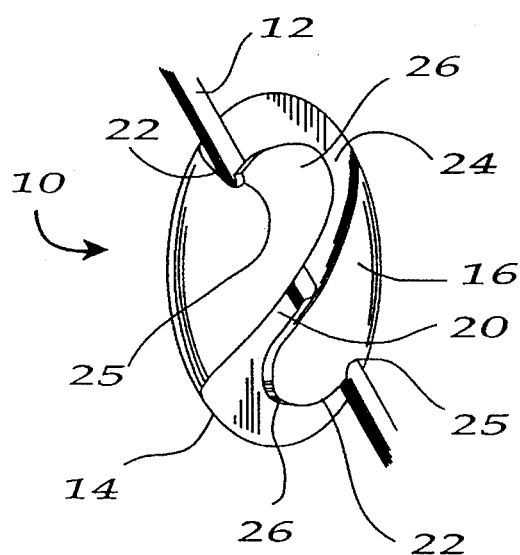
FIG. 1 is a perspective view showing a front side view of a line holding storage device according to the first embodiment of the present invention.
Figure 2:
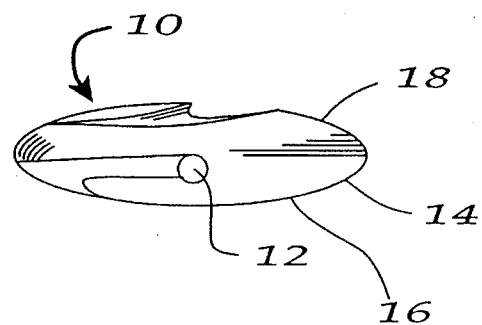
FIG. 2 is a top plan view showing the line holding storage device of FIG. 1.

Now, referring to the drawings, like numbers represent the same elements in the various figures. As illustrated in FIGS. 1 and 5, the embodiments of the present invention include a line holding storage device, as indicated generally at 10, for storing or displaying articles (not shown) in random locations along a line 12. As shown in FIGS. 2 and 7, each embodiment line holding storage device 10 includes a support housing 14 having a front side and a back side 18. The support housing 14 is preferably constructed of substantially rigid material, such as plastic, wood metal, or equivalent materials.

As illustrated in FIGS. 1 and 7, in each embodiment a channel 20 is formed in the front side 16 of the support housing 14 and is shaped and sized to receive the line 12. Each channel 20 extends over at least a portion of the front side 16 and serves to stabilize the line holding storage device 10 about a line 12, as will be described further below.

As illustrated in FIGS. 1–4, a first embodiment of line holding storage device 10 of the present invention is shown. Referring to FIG. 1, a securing mechanism 22 is positioned on the front side 16 of support housing 14 and cooperates with channel 20 for releasably securing line holding storage device 10 to line 12.

Figure 3:
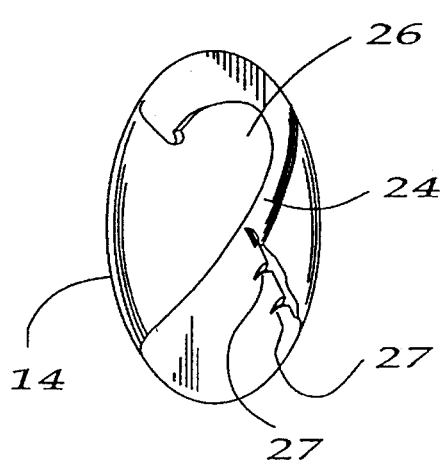
FIG. 3 is a perspective view, with a portion broken away, showing the line holding storage device" of FIG. 1.

In this first embodiment, securing mechanism includes an "S"-shaped channel 24 which is defined by a pair of opposite-facing tabs 26, and the "S"-shaped channel 24 overlying channel 20. Channel 20 may also be defined as the line locking channel, and opposite-facing tabs 26 may also be defined as pincer arms. It is seen that "S"-shaped channel 24 narrows at its center, preferably to a width less than the diameter of line 12. At each end of "S"-shaped channel 24 is an enlarged scalloped portion 25 which allows line 12 to snap-fit to be releasably held therein. Furthermore, as illustrated in FIG. 3, one or more edged ribs 27 are located on the underside of tabs 26 to assist in securing line holding storage device 10 against slippage on line 12. It is within the practice of the present invention to either remove ribs 27 from the underside of tabs 26, or to replace them with other slip reducing means, such as roughened surfaces, or cleats, or the like.

To attach and secure support housing 14, constructed according to the first embodiment of the present invention, to line 12, line 12 is first placed in the center portion of "S"-shaped channel 24 of support housing 14. Since the width of channel 24 narrows to a point which is actually less than the diameter of line 12, line 12 is press-fit into channel 24. Then, support housing 14 is rotated until line 12 is rotated under each of tabs 26 and enters into channel 20. Rotation of support housing 14 continues until support housing 14 has rotated approximately 90 degrees. The press-fit of line 12 into channel 24 and enlarged scalloped portion 25 secures the line holding storage device 10 to line 12 while tabs 26 and edged ribs 27 deter the line holding storage device 10 from sliding or being dislodged if bumped or otherwise disturbed.

In a second embodiment of the line holding storage device 10 of the present invention is illustrated in FIGS. 5–8. In this embodiment securing mechanism 22 comprises a substantially cylindrical sleeve mounted on the front side 16 of support housing 14 above channel 20. The sleeve 28 is essentially an off-centered, hollow cylindrical housing protruding outwardly from the front side 16. The sleeve 28 includes an outer cylindrical wall 30 with a pair of opposed, aligned, but spaced apart line receiving slots 32 formed in cylindrical wall 30. At least a portion of line receiving slots 32 are aligned with channel 20, such that any line 12 which is located within channel 20 will pass through line receiving slots 32 without any substantial bending or deformation of line 12. The passage of line 12 through line receiving slots 32 and channel 20 will be described further below.

The securing mechanism 22 of the second embodiment further includes a clasping button 34 seated substantially within sleeve 28. As illustrated in FIG. 8, clasping button 34 is movable long a longitudinal axis 36 of sleeve 28 and includes an upper line receiving aperture 38, as illustrated in FIG. 6, and a lower line receiving aperture 40 aligned with at least a portion of line receiving slots 32 of sleeve 28. The clasping button 34 and sleeve 28 may be constructed from the same material as support housing 14, but may also be constructed of different material.

As illustrated in FIG. 8, sleeve 28 further includes a pair of oppositely-spaced, vertically-aligned guide slots 42. Sleeve guide slots 42 are designed to be aligned with partially-overlapping, oppositely-spaced, angled camming slots 44 formed in clasping button 34 seated within sleeve 28. When holding storage device 10 of this embodiment is in a vertical orientation, then camming slots 44 are preferably angled in a direction which is generally downward and away from front side 16 of support housing 14. The angling of camming slots 44, as described, provides for at least a portion of camming slots 44 of clasping button 34 to align with the guide slots 42 of the sleeve 28 regardless of the position of clasping button 34 in sleeve 28.

A cam-following roller 46 extends through guide slots 42 and camming slots 44, and is capable of moving within guide slots 42 and camming slots 44 as clasping button 34 is moved inwardly and outwardly within sleeve 28 along longitudinal axis 36 of sleeve 28. The roller 46 limits the movement of clasping button 34 within sleeve 28 to only the movably overlapping portion of the lengths of guide slots 42 and camming slots 44. As illustrated in FIG. 6, each end 48 of roller 46 is enlarged, and has a dimension greater than the width of guide slots 42 and camming slots 44 in order to maintain roller 46 within guide slots 42 and camming slots 44. Cam-following roller 46 may be constructed of plastic or of any durable, substantially rigid, smooth material such as metal, wood, or ceramic.

As illustrated in FIG. 8, a biasing member, such as spring 50, is provided and positioned within sleeve 28 directly beneath clasping button 34. Spring 50 biases clasping button 34 away from sleeve 28 along the longitudinal axis 36 of sleeve 28 causing roller 46 to follow camming slots 44 in a generally upward direction . Only when the clasping button 34 is maneuvered into sleeve 28 by compelling clasping button 34 in a generally inward direction along longitudinal axis 36 of sleeve 28 will roller 46 follow camming slots 44 in a generally downward and outward direction. When in such a downward and outward position, the roller 46 will be located in a non-interfering, non-clasping position such that line receiving slots 32, line receiving apertures 38, 40 and channel 20 will be aligned. Such alignment is important for insertion and grasping of line 12, as described below.

To secure the support housing 14 to the line 12 with the support device 10 of the second embodiment of the present invention, first, the clasping button 34 is manipulated into its 4 non-clasping position by pressing clasping button 34 into sleeve 28 against the bias of spring 50. As mentioned above, the action of pressing clasping button 34 causes line receiving slots 32, line receiving apertures 38, 40 and channel 20 to align. The line 12 is then easily inserted into line receiving slots 32 and line receiving apertures 38, 40 and placed within channel 20. Upon release of clasping button 34, spring 50 will bias clasping button 34 outward thereby causing roller 46 to follow camming slots 44 upward into a clasping position and clasp line 12 between roller 46 and an outer wall 52 surrounding the upper line receiving aperture 38. This clasping position is maintained by the force of spring 50 and will continue until clasping button 34 is depressed to cause roller 46 to move downward, out of clasping position with line 12, as described above.

It is within the scope of the second embodiment to have a roughened or a gripping surface (not shown) formed along a longitudinal axis of roller 46 to assist in gripping line 12 and securing line holding storage device 10 to line 12. It is also within the scope of the present invention to substitute the line receiving slots 32 of sleeve 28 with apertures (not shown). Such substitution would, upon insertion of line 12 and release of clasping button 34, provide securement of support housing 14 to line 12 by clasping line 12 between wall 52 of the upper line receiving aperture 38 of sleeve 28 and clasping button 34.

Figure 4:
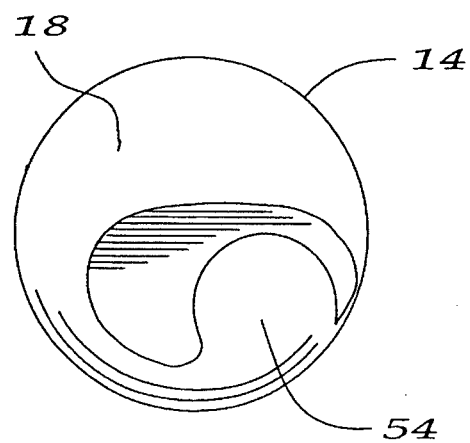
FIG. 4 is a back side elevational view showing the line holding storage device of FIG. 1.

In the first embodiment of the present invention, as illustrated in FIG. 4, an off-centered catch mechanism 54 is mounted on the back side 18 of support housing 14 for hanging items, such as sporting goods, toys, or hangers, which items are to be stored or displayed. The catch mechanism 54 is in a position such that the weight of any item hanging on catch mechanism 54 will cause further clockwise rotation of support housing 14, thereby tightening the grip of support housing 14 on line 12 and maintaining the press-fit of line 12 into channel 24 and scalloped portion 25. The catch mechanism 54 of the first embodiment can be designed such that items can hang from the support housing 14 regardless of whether the line holding storage device 10 is secured to a vertical, horizontal or angled line 12.

In the second embodiment of the present invention, as illustrated in FIG. 5, a substantially centered, multi-directional catch mechanism 56 is provided on the front side 16 of the support housing 14 below sleeve 28 and clasping button 34. The catch mechanism 56 is essentially bifurcated by channel 20 such that line 12, when positioned in channel 20, substantially divides the catch mechanism 56. Furthermore, catch mechanism 56 is positioned such that when an item hangs on catch mechanism 56, the force of the weight of the item is aligned with the line receiving slots 32 and line receiving apertures 38, 40. By having the weight aligned in such a manner, the weight of the item encourages further clasping by the roller 46. Please note that it is also within the scope of the present invention to have the catch mechanism 56 mounted on the back side 18 of support housing 14 if so desired.

A distinct advantage of the securing mechanisms 22 of the present invention is that the mass of any item which is hung from either catch mechanism 26 encourages increased clasping capabilities of the line holding storage device 10 on line 12. For instance, in the first embodiment of the present invention when an item, not shown, is attached to a catch mechanism 26, as described above, the mass of the item causes the line holding storage device 10 to be to rotated, for example, in the clockwise direction, thereby reinforcing the press-fit of line 12 into channel 24. In the second embodiment, the mass of an item tends to pull the line holding storage device 10 in a direction which increases the hold between the roller 46 and outer wall 52 of the upper line receiving aperture 38. It is therefore seen that the second embodiment of the present invention is best used with vertical or angled lines, but is not easily used with horizontal lines.

The securing mechanisms 22 of both the first and second embodiments of the present invention allow the line holding storage device 10 to be positioned in a multitude of random locations along the length of any line 12. Such position availability allows a system of multiple line holding storage devices to be established which can be rearranged, without loosening the line, and the line holding storage devices to be spaced and organized to accomplish and satisfy the needs of the items being stored or displayed.

It is therefore seen that the device of the present invention provides a line holding storage device 10 for attachment to a vertical, horizontal or angled line for securing or storing an item on a line 12, which line holding storage device does not tend to be pulled from the line when the load is increased. The line holding storage device 10 of the present invention may be located in a multitude of random locations along the line 12. Additionally, line 12 used with the line holding storage devices 10 does not have to be slack, but instead can be taut or even rigid. Furthermore, the present invention device provides a line holding storage device for attachment to a line which does not require that the line be slack prior to attachment of the device. Additionally, the device of the present invention provides a line holding storage 10 device which is capable of being secured to a deformable, semi-rigid, rigid, or taut vertical, horizontal or angled line which is held by any structure. Furthermore, the device of the present invention provides a system of line holding storage devices which can be randomly located on a 14 line to allow a variety of goods to be stored or displayed, and which provides such a line holding storage device which is provided with a mechanism such that articles can be stored or displayed on the device. Finally, the device of the present invention can not only be randomly secured to a line, but, does not require release of line tension and/or the movement of the mechanism relative to the line in order to remove it from the line.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

The embodiments of the invention for which an exclusive privilege and property right are claimed are defined as follows:

1. A line holding device, having no moving pans for holding articles on a line in random fixed locations along such a line, comprising:

a support housing having a body;

a line receiving channel integral with said support housing;

securing means integral with said support housing and cooperating with said line receiving channel for releasably securing said line holding device to a line for release from such a line without moving said support housing relative to such a line;

catch mechanism means mounted on said support housing for holding articles, said catch mechanism means positioned in a manner such that the weight of any article carried by said catch mechanism means increases the attachment of said securing means of said line holding device to any associated line; and said securing means further comprising a pair of opposing pincer arms integral to the body of the support housing defining a locking channel for the line.

2. The line holding device of claim 1 wherein said securing means includes an "S"-shaped channel which overlies said line receiving channel.

3. The line holding device of claim 2 wherein at least a portion of said "S"-shaped channel has a width less than the diameter of the line with which it is intended to be used, so that when said support housing has a line press-fit into said "S"-shaped channel and then rotated about such a line, the line enters said "S"-shaped channels to thereby releasably securing said line holding device to any such a line.

4. The line holding device of claim 3 wherein said line receiving channel carried by said support housing receives any such line.

5. The line holding device of claim 1 wherein said line receiving channel carried by said support housing receives any such line.

6. The line holding device of claim 5 including a line.

7. The method of using the line holding device of claim 7 wherein a line support housing has a line press-fit into said "S" shaped channel and said line support housing is then rotated about said line so that said line enters said "S"-shaped channels to thereby releasably securing said line holding device to said line.

8. The line holding device of claim 1 including a line.

9. A line holding device for holding articles on a line, comprising:

a support housing having a first and a second side;

a line receiving channel carried by said support housing, said channel designed to receive a line;

a sleeve mounted on said support housing, said sleeve having a pair of line receiving slots and a pair of guide slots;

a clasping button movably positioned within said sleeve, said clasping button having an upper line receiving aperture, a lower line receiving aperture and a pair of angled camming slots overlaying said guide slots of said sleeve, so that a line may extend through said line receiving slots of said sleeve and the line receiving apertures of said clasping button;

roller means extending through said guide slots and said camming slots for camming to a clasping position, with a line so that a line may be clasped between said clasping button and said roller;

biasing means positioned within said sleeve for biasing said clasping button away from said sleeve and maintaining the clasping position, thereby releasably securing the line holding device to a line; and catch mechanism means mounted on said support housing for holding articles, said catch mechanism means positioned in a manner such that the weight of any article carried by said catch mechanism means increases the attachment of said securing means of said line holding device to any associated line.

10. The line holding device of claim 9 wherein said sleeve is mounted on said first side of said support housing.

11. The line holding device of claim 10 wherein said catch mechanism means are mounted on said first side of said support housing.

12. The line holding device of claim 11 wherein said catch mechanism means includes a catch mechanism mounted on said support housing, said channel bifurcating said catch mechanism with a line positioned within said channel.

13. The line holding device of claim 12 wherein said catch mechanism means includes an off-center catch mechanism mounted on said second side of said support housing so that any item supported by said catch mechanism biases said housing support in a rotational direction to maintain the press-fit of the line into said channel.

14. The line holding device of claim 13 including a line.

15. The line holding device of claim 14 wherein the line is substantially rigid.

16. The line holding device of claim 9 including a line.

17. A device for holding an article in fixed position on a line, comprising:

a support housing having a pair of opposing pincer arms integral with said housing, said pincer arms further defining a line receiving channel for initially receiving said line and a line locking channel for securing said line in said support housing:

said line receiving channel being "S" shaped and said line locking channel being disposed underneath said opposing pair of pincer arms and perpendicular to a portion of said line receiving channel, whereby said line is initially received in said line receiving channel and said support housing is rotated 90° securing said line in said locking channel;

said pincer arms further comprising a textured face, whereby said line is pressed against said textured face and said support housing is held in a fixed position on said line; and a catch mechanism means for holding said article mounted off center on said housing, whereby a weight of said article causes the support housing to swivel and lock said line in said locking channel.

* * * * *